May 10, 1960 R. E. SHEAHAN 2,936,359
THERMOSTATIC CONTROL PLUG
Filed Aug. 9, 1956 2 Sheets-Sheet 1
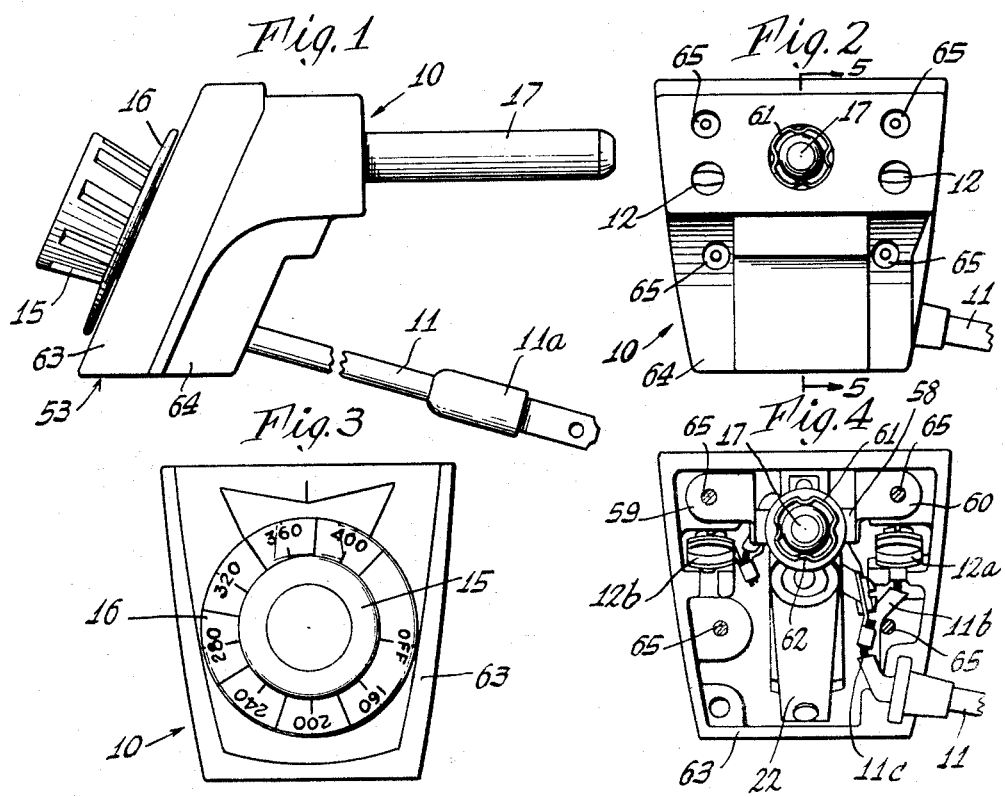
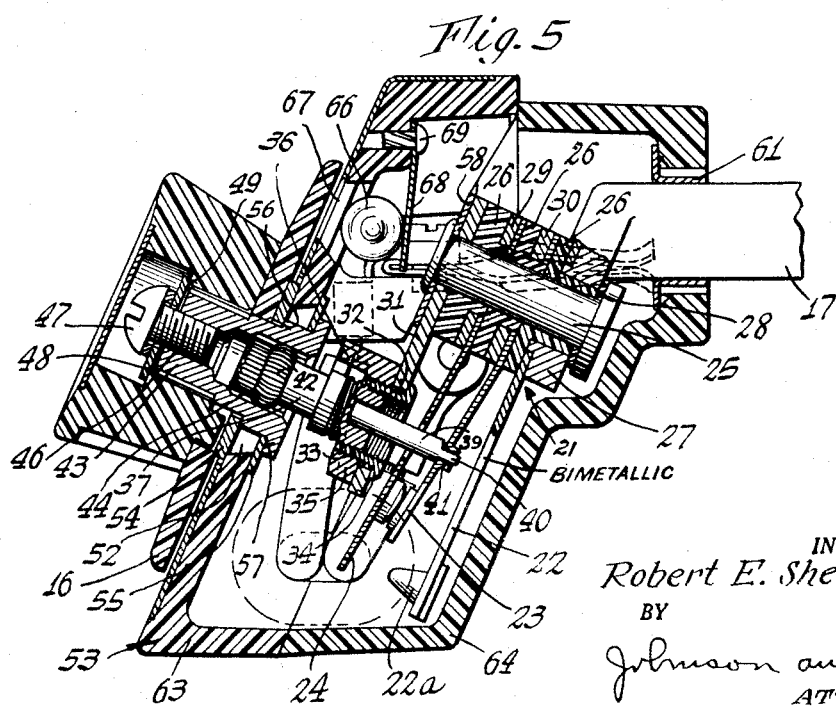
INVENTOR.
Robert E. Sheahan
BY
Johnson and Kline
ATTORNEYS

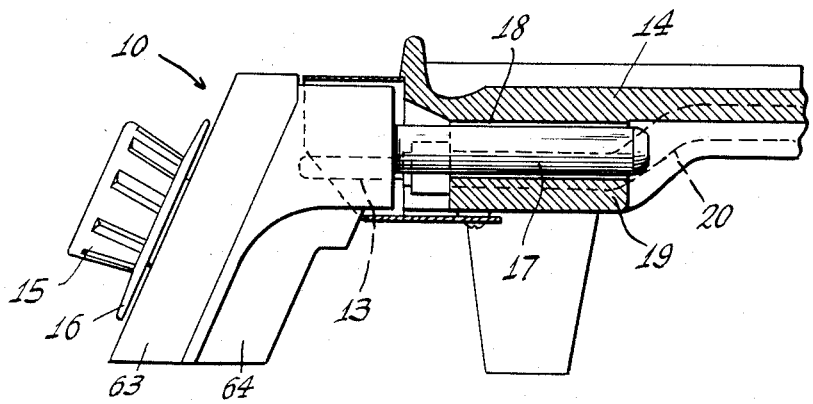

United States Patent Office 2,936,359
Patented May 10, 1960

2,936,359

THERMOSTATIC CONTROL PLUG

Robert E. Sheahan, Bridgeport, Conn., assignor to Casco Products Corporation, Bridgeport, Conn., a corporation of Connecticut Application August 9, 1956, Serial No. 603,043

7 Claims. (Cl. 219—44)

The present invention relates to an electrical plug for detachable connection to a utensil and to a source of electric current and more particularly, to a plug in which a temperature control for the utensil is incorporated therein.

An object of the invention is to provide a plug which can be detachably connected to an electrical heating utensil and which can control the temperature of the utensil.

Another object of the invention is to provide a control plug which is capable of being utilized on a plurality of utensils.

A further object of the invention is to provide a control plug of the above-disclosed type in which the plug is so shaped that when it is attached to a utensil, a substantial portion of the plug is located below the heated surfaces of the utensil.

Another object of the present invention resides in mounting the heated portions of the plug in a casing with a substantial minimization in the heat conducted to the casing.

A feature of the instant invention resides in a control plug having a temperature sensing probe and a thermostatic switch in which the probe has a downwardly depending portion to which is connected the thermostatic switch and the casing which surrounds and protects the switch is accordingly positioned beneath the heated portions of the cooking utensil and connection of the heat thereto is prevented. Transfer of heat by the probe and the switch to the casing is minimized by mounting the switch in the casing by only two sheet metal wings while a heat insulating bushing is interposed between the probe and the casing. In addition to preventing excessive heating of the casing, such construction provides a more accurate and responsive thermostatic control.

Another feature of the invention is a provision of a control knob assembly which is economical to assemble and in which the axial movement thereof is limited but in which eccentricity between the axis of the knob and the thermostatic switch will not cause binding or rubbing of the control knob on the casing.

Other features and advantages will hereinafter appear.

Referring to the drawing:

Figure 1 is an elevation of the control plug of the present invention.

Fig. 2 is an end view thereof.

Fig. 3 is a front elevation thereof.

Fig. 4 is a view similar to Fig. 2 with the rear portion of the casing removed.

Fig. 5 is a sectional view taken substantially on the line 5—5 of Fig. 2.

Fig. 6 is a view of the plug as attached to a cooking utensil with portions of the utensil being shown in section.

Referring to the drawing, the temperature control plug of the present invention is indicated generally by the reference numeral 10. A two-wire electric cord 11 extends therefrom and has a male plug 11a at its end for plugging into the conventional electric socket, which may have a voltage on the order of 120 volts. The plug 10 has two female outlets 12 on its rear face for connection with male contacts 13 of an electric heating utensil 14. The front portion of the plug 10 is provided with a rotatable knob 15 and a dial 16 in order to permit adjusting the temperature at which it is desired to maintain the heating surfaces of the utensil.

As shown in Figs. 1 and 6, a temperature sensing probe 17 is provided extending from the rear face of the plug 10 and is adapted to enter a hole 18 formed in a thickened portion 19 of the utensil 14. The probe has an easy sliding fit with the hole and is formed of good heat conducting material such as aluminum, and thus the temperature of the probe throughout its length approximates that of the cooking utensil. On each side of the hole 18 there extends from the utensil an end of an electrical resistance heating element 20 which is embedded in the body of the utensil 14 and the contacts 13 are connected thereto. The contacts are disclosed and claimed in my copending application, Serial No. 597,493, filed July 12, 1956. Electric current to the heating element passes through the plug and is controlled by the switch therein which, in turn, is controlled by the temperature of the probe, the temperature of the latter closely approaching the temperature of the utensil.

Referring to Fig. 5, a thermostatic switch, indicated generally by the reference numeral 21, of the present invention has a bi-metallic thermostatic operating arm 22 provided with an insulating bushing 22a, which may be formed of ceramic material, an adjustable contact arm 23 and a fixed contact arm 24. These three arms are mounted on a hollow rivet 25 and maintained in spaced apart, electrically insulated relation, by means of stepped insulating washers 26, which are preferably formed of ceramic material. Mounted on the rivet 25 in contact with the arm 22 is an angularly displaced and flattened portion 27 of the probe 17 to provide good heat transfer between the probe and the arm 22. An insulating washer 28, which may be of mica, is positioned between the bent portion of the probe and the head of the rivet. Thus, a probe is insulated from the rivet 25 by the washer 28 and by a stepped washer 26.

In order to provide for the conduction of current through the plug to the outlets 13, one wire 11b of the cord 11 is connected directly to a female outlet 12a while the other line 11c is connected to the thermostatic switch 21 and then to the other outlet 12b. Mounted on the rivet 25, in electrical conducting relation with the arm 24, is a bent metal conductor 29 to which the cord 11c is secured. Another bent metal conductor 30 is provided on the rivet 25 in contact with the arm 23 for permitting connection to the outlet 12b. Accordingly, current can flow directly to one outlet and through the arms 24 and 23 to the other outlet to provide control of the current by the thermostatic switch 21. The conductors 29 and 30 are insulated from the rivet 25 by means of the insulating washers 26.

In operation, when the temperature of the utensil reaches the temperature set by the knob 15, heat will be transmitted to the probe 17 and thence to the arm 22 causing bending of the arm 22 such that the plug 22a contacts arm 24 to move it away from arm 23, thereby breaking the circuit. The switch arm 24 is constructed so as to be biased counterclockwise while the switch arm 23 is biased clockwise so that they are normally biased toward each other so as to be maintained in contact. In order to alter the temperature at which the switch reacts the arm 23 is moved closer to the arm 22 for a lesser temperature setting and away from it for a higher temperature setting.

In accomplishing the temperature adjustment according to the present invention, a flat support member 31 is mounted on the rivet 25 and depends downwardly. At its lower end there is provided an aperture 32 in which is positioned an internally and externally threaded tube 33 having a flanged end portion 34. A nut 35 is threaded on the exterior of the tube 33 and the nut 35 and the flange 34 are secured by clamping the portion of the support member 31 adjacent the aperture 32 therebetween. The nut 35 carries a stop projection 36. A shaft 37 has a threaded end portion cooperating with the internal threads of the tube 33 and freely carries a pin 39, formed from electrically insulating material such as ceramic. The insulating pin 39 has a reduced end 40 which fits into an aperture 41 formed in the arm 23. The pin is maintained in position by the biasing of the arm 23 clockwise.

The shaft 37 is splined as at 42 at its other end and thereover a sleeve 43 is fitted. The sleeve 43 has an axial aperture 44 which is internally splined at one end for cooperation with the splined end 42. The other end portion of the sleeve is internally threaded as at 46 to receive a screw 47. A washer 48 is mounted beneath the head of the screw 47 and engages with a step 49 formed in the knob 15. The knob 15 is preferably formed with splines which cooperate with splines formed on the exterior of the sleeve 43. The casing 53 of the plug 10 is formed with an aperture 52 through which the sleeve 43 extends. Washers 54 and 55 encircle the sleeve and engage the interior and the exterior adjacent surfaces of the casing respectively, and also engage steps 56 and 57 respectively, formed on the sleeve 43. The above, in addition to providing an economical and easily assembled thermostat switch adjustment, also enables eccentricity to exist between the axes of the shaft 37 and the axes of the knob 15 without causing binding when the knob is rotated. This is accomplished by reason of having the splined portion 42 outwardly curved along a length thereof which acts as a universal joint. The diameter of the aperture in the sleeve is substantially equal to the largest diameter of the outwardly curved portion.

It will be appreciated that in the above construction that the control knob is connected to the sleeve 43 and hence to shaft 37 by only a single screw 47 and upon threading of the screw 47, the washers 48 and 54 clamp the knob 15 and dial 16 and the washer 55 prevents outward movement of the sleeve. Also the aperture 52 is larger than the portion of the sleeve 43 which extends therethrough which permits radial movement in any direction of the sleeve in the aperture and hence the knob along the front of the housing.

The casing 53 is preferably formed of molded plastic material and is composed of a front section 63 on which the knob 15 is positioned and a rear section 64 through which the probe 17 extends. The shape of the casing is as shown and it will be noted that the interior portion is hollow to accommodate the thermostatic switch. The switch assembly is mounted in the casing 53 by means of a sheet metal support 58 (which is formed of stainless steel in the instant embodiment) having an aperture formed in its intermediate portion through which the rivet 25 passes. The end portions are angularly displaced and bent to form wings 59 and 60. The two sections are fastened together by means of upper and lower sets of rivets 65, the upper set of rivets 65 also secures the wings 59 and 60 to the casing. An insulating bushing 61 encircles the probe 17 and is provided with articuate indentations 62 so that only small portions of the bushing contact the probe thereby minimizing the heat conduction between the probe and the casing. The bushing is metal and preferably from a relatively poor heat conducting metal such as stainless steel. The temperature of the casing contacting the bushing is thus materially less than the temperature of the probe.

Additionally, mounted inside the casing 53 is an electric bulb 66. The bulb is positioned adjacent an aperture 67 formed in the casing 53 adjacent one portion of the periphery of the dial 16 so that it illuminates an arc of the dial. The dial 16 may preferably be formed of light transmitting or transparent material to provide for a good visibility of the dial setting. A lamp retaining shield 68, held in place by a drive screw or rivet 69, maintains the lamp in position.

By reason of the above construction, it will be apparent that the temperature of the casing is maintained at a minimum. This is accomplished by the insulating bushing 61 and by having the thermostatic switch held solely by two wings 59 and 60 whereby heat conduction between the probe to the casing and the switch to the casing is minimized. This construction of the plug enables use of colored plastic material for the casing since no portion of the casing reaches a temperature at which the plastic material would be deformed. In the absence of such heat conducting structure, the color of the casing material would be limited to black or dark brown since they are the only available and commercially feasible plastic material which can withstand the temperature at which the probe functions. Further, most of the body of the plug is located below the heated surfaces of the utensil which minimizes heat transfer thereto.

Variations and modifications may be made within the scope of the claims and portions of the improvements may be used without others.

I claim:

1. A thermostatic control plug for use with an electric utensil comprising a hollow casing; an electrical cord extending from the casing and adapted to be detachably connected to a standard household fixture; a pair of outlets in the casing for connection to a heating element on the utensil; a temperature sensing probe extending from the casing for sensing the temperature of the utensil; a switch in said casing electrically connected between the cord and the outlets and having a temperature responsive element mounted in heat conducting relation with the temperature sensing probe to actuate the switch; a support member for the switch and having two spaced apart end portions for mounting the switch in the casing whereby heat conduction to the casing is minimized in which the casing is formed in two sections; means securing the sections together; and in which the means also secures the end portions to the casing.

2. A thermostatic control plug for use with an electric utensil comprising a hollow casing formed in two sections; an electrical cord extending from the casing and adapted to be detachably connected to a standard household fixture; a pair of outlets in the casing for connection to a heating element on the utensil; a temperature sensing probe extending through an aperture formed in the casing for sensing the temperature of the utensil and having an angularly displaced and normally downwardly extending end portion located within the casing; a bushing formed of metal and having a plurality of semi-cylindrical indentations positioned between the probe and the portion of casing adjacent the aperture; a switch in said casing electrically connected between the cord and the outlets and having a temperature responsive element mounted in heat conducting relation with the angularly displaced portion of the probe to actuate the switch; a support member for the switch having two spaced apart end portions; and means securing the sections of the casing together and the end portions of the switch support member to the casing.

3. An adjustable thermostatic plug comprising a hollow casing having an aperture formed in its front face; an electrical switch positioned in the casing; temperature actuated means for controlling the switch; and means for permitting adjustment of the temperature at which the switch is actuated; said means including a shaft, a sleeve mounted on the shaft for limited universal movement therebetween and extending through the aperture in the casing, means secured to the sleeve and engaging the casing on opposite sides of the aperture for limiting axial movement of the sleeve, and a knob positioned exterior of the casing connected to the sleeve whereby binding of the knob caused by eccentricity between the axes of the shaft and knob is substantially obviated, said means permitting radial movement of the sleeve in the aperture.

4. An adjustable thermostatic plug comprising a hollow, elongate casing having an aperture formed in its front face; an electrical switch positioned in the casing; means for detachably connecting the switch to a source of electric current and to heating element of a cooking utensil; a temperature sensing probe extending from the casing at an angle to the length of the casing; temperature responsive means mounted in heat conducting relation to the probe for actuating the switch; and means for permitting adjustment of the temperature at which the switch is actuated; said means including a shaft, a sleeve connected on the shaft for limited universal movement therebetween and extending through the aperture in the casing, means secured to the sleeve and engaging the casing on opposite sides of the aperture for limiting axial movement of the sleeve and a knob connected to the sleeve and positioned exterior of the casing opposite from the probe, whereby the knob is accessible when the plug is attached to a cooking utensil and binding of the knob caused by eccentricity between the axes of the shaft and knob is substantially obviated.

5. A manually adjustable temperature controlling attachment plug for electrical cooking devices comprising a body of heat-insulating material; contact prong sockets engageable through the rear of the body at its upper end to engage horizontally disposed contact prongs mounted on the cooking device adjacent an edge thereof, said body extending downwardly and away from the contact prong sockets and forming a hand-grip portion for manipulation of the plug; a manually adjustable thermostat in circuit with said contact sockets located in said hand-grip portion of the body; a heat-conducting probe connected to said thermostat and having a portion extending horizontally beyond the rear of the body at the upper end thereof to be positioned to engage the part of the cooking device to which the plug is attached adjacent said contact prongs; in which the front of the hand-grip portion has a surface inclined upwardly and toward the rear of the plug; a knob connected to the thermostat for adjusting the same over the desired temperature range and located over said inclined surface; and indicator means on said knob and said inclined surface for indicating the setting of the thermostat, said knob and indicator means being readily viewable from any point located between the front of the plug and the top of the plug.

6. An adjustable thermostatic plug comprising a hollow casing having an aperture formed in its front face; an electrical switch positioned in the casing; temperature actuated means for controlling the switch; and means for permitting adjustment of the temperature at which the switch is actuated; said means including a shaft, a sleeve mounted on the shaft for limited universal movement and extending through the aperture in the casing, means secured to the sleeve and engaging the casing on opposite sides of the aperture for limiting axial movement of the sleeve, and a knob positioned exterior of the casing connected to the sleeve whereby binding of the knob caused by eccentricity between the axes of the shaft and knob is substantially obviated, said means permitting radial movement of the sleeve in the aperture, in which the sleeve has a bore internally splined, the shaft has an end portion externally splined fitting into the bore, in which the shaft along a portion of its splined end is outwardly curved, and in which the means engaging the casing consists of a pair of washers which permit rotative movement of the sleeve with respect to the washer.

7. A manually adjustable temperature controlling attachment plug for electrical cooking devices comprising a body of heat-insulating material; contact prong sockets engageable through the rear of the body at its upper end to engage horizontally disposed contact prongs mounted on the cooking device adjacent an edge thereof, said body extending downwardly and away from the cooking device and forming a hand-grip portion for manipulation of the plug; a manually adjustable thermostat in circuit with said contact sockets located in said hand-grip portion of the body; a heat-conducting probe connected to said thermostat and positioned to engage the body of the cooking device to which the plug is attached adjacent said contact prongs; in which the front of the hand-grip portion has a surface inclined upwardly and toward the rear of the plug; a knob connected to the thermostat for adjusting the same over the desired temperature range and located over said inclined surface; indicator means on said knob and said inclined surface for indicating the setting of the thermostat, said knob and indicator means being readily viewable from any point located between the front of the plug and the top of the plug; in which the indicator means includes a light transmitting dial rotatable with the knob; and an electric lamp is located within the body and under the said dial to transmit light to the dial through an aperture in the casing.

References Cited in the file of this patent

UNITED STATES PATENTS

| Re. 20,570 | Bushway | Dec. 7, 1937 |
|---|---|---|
| 1,431,542 | Ross | Oct. 10, 1922 |
| 1,537,227 | Dewitt | May 12, 1925 |
| 1,572,666 | Marsden | Feb. 9, 1926 |
| 1,593,638 | Moyer | July 27, 1926 |
| 1,662,817 | Bollmann et al. | Mar. 20, 1928 |
| 1,813,267 | Arnesen | July 17, 1931 |
| 2,024,471 | Norton | Dec. 17, 1935 |
| 2,213,722 | Smith | Sept. 3, 1940 |
| 2,299,462 | Clark et al. | Oct. 20, 1942 |
| 2,518,595 | Bletz | Aug. 15, 1950 |
| 2,674,133 | Ireland | Apr. 16, 1954 |
| 2,744,995 | Jepson | May 8, 1956 |

FOREIGN PATENTS

| 103,183 | Switzerland | Jan. 16, 1924 |
|---|---|---|
| 543,995 | Germany | Feb. 12, 1932 |
| 785,298 | France | May 13, 1935 |
| 511,383 | Great Britain | Aug. 17, 1939 |
| 599,517 | Great Britain | Mar. 15, 1948 |
| 725,341 | Great Britain | Mar. 2, 1955 |